(12) United States Patent
Zheng et al.

(10) Patent No.: US 12,431,704 B2
(45) Date of Patent: Sep. 30, 2025

(54) POWER SUPPLY SYSTEM AND POWER SUPPLY CONTROL METHOD THEREOF

(71) Applicant: Huawei Digital Power Technologies Co., Ltd., Shenzhen (CN)

(72) Inventors: Mugui Zheng, Dongguan (CN); Wanxiang Ye, Dongguan (CN); Tao Feng, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 292 days.

(21) Appl. No.: 18/152,279

(22) Filed: Jan. 10, 2023

(65) Prior Publication Data

US 2023/0163590 A1 May 25, 2023

Related U.S. Application Data

(63) Continuation of application No. PCT/CN2020/102080, filed on Jul. 15, 2020.

(51) Int. Cl.
| | |
|---|---|
| *H02J 1/10* | (2006.01) |
| *H02J 7/35* | (2006.01) |
| *H02S 40/36* | (2014.01) |
| *H02S 50/00* | (2014.01) |

(52) U.S. Cl.
CPC ............... *H02J 1/10* (2013.01); *H02S 40/36* (2014.12); *H02S 50/00* (2013.01); *H02J 7/35* (2013.01); *H02J 2300/24* (2020.01)

(58) Field of Classification Search
CPC .. H02J 1/10; H02J 7/35; H02J 2300/24; H02J 3/381; H02J 1/102; H02S 40/36; H02S 50/00; H02S 40/30; Y02E 10/50; Y02E 10/56
See application file for complete search history.

(56) References Cited

U.S. PATENT DOCUMENTS

| | | | |
|---|---|---|---|
| 7,962,249 B1 * | 6/2011 | Zhang | H02J 3/381 700/297 |
| 2012/0032665 A1 * | 2/2012 | Shaver, II | H02J 3/38 323/318 |
| 2018/0233919 A1 * | 8/2018 | Gu | H02S 40/32 |
| 2020/0185923 A1 * | 6/2020 | Yang | H02J 3/381 |

FOREIGN PATENT DOCUMENTS

| | | |
|---|---|---|
| CN | 103490650 A | 1/2014 |
| CN | 109428544 A | 3/2019 |
| EP | 2546947 A2 | 1/2013 |
| WO | 2017196735 A1 | 11/2017 |

\* cited by examiner

*Primary Examiner* — Metasebia T Retebo
(74) *Attorney, Agent, or Firm* — Maier & Maier, PLLC

(57) ABSTRACT

A power supply system includes at least two photovoltaic module groups, one photovoltaic module group includes at least one photovoltaic module, the at least one photovoltaic module is connected to at least one photovoltaic adapter, and photovoltaic adapters connected to photovoltaic modules in a same photovoltaic module group are connected in series. The power supply system further includes a junction box, a bus, and a centralized monitoring system. The photovoltaic adapters of each of the at least two photovoltaic module groups are connected in parallel to the junction box after being connected in series and are connected to the bus by using the junction box.

8 Claims, 8 Drawing Sheets

POWER SUPPLY SYSTEM AND POWER SUPPLY CONTROL METHOD THEREOF

CROSS-REFERENCE TO RELATED APPLICATIONS

This application is a continuation of International Application No. PCT/CN2020/102080, filed on Jul. 15, 2020, the disclosure of which is hereby incorporated by reference in its entirety.

TECHNICAL FIELD

The embodiments may relate to the field of electric power technologies, a power supply system, and a power supply control method thereof.

BACKGROUND

Currently, a base station device is usually powered by solar energy or solar hybrid energy in a region with no or poor mains. In a research and practice process, it has been found that, as shown in FIG. 1, in a solar base station power supply system in the conventional technology, photovoltaic panels (namely, solar panels) of a fixed quantity (for example, three) are connected in series to obtain one photovoltaic string, a plurality of photovoltaic strings are connected in parallel to a photovoltaic junction box and are combined in the photovoltaic junction box, a voltage obtained after the plurality of photovoltaic strings are combined is input into a direct current/direct current (direct current to direct current, DC/DC) converter, and the DC/DC converter performs voltage power conversion on the voltage, to obtain a −48 V voltage, and then supplies power to a base station device. However, in the solar base station power supply system in the conventional technology, when the DC/DC converter fails, electric energy of the photovoltaic panels on the plurality of photovoltaic strings that are combined to the DC/DC converter by using the photovoltaic junction box and on which voltage power conversion is performed by the DC/DC converter cannot be output. Consequently, the power supply system has insufficient power supply and poor applicability.

SUMMARY

The embodiments may provide a power supply system and a power supply control method thereof, to improve management flexibility of a photovoltaic module in the power supply system and improve power supply reliability of the system with high applicability.

According to a first aspect, the embodiments may provide a power supply system. The power supply system includes at least two photovoltaic module groups, one photovoltaic module group includes at least one photovoltaic module, the at least one photovoltaic module is connected to at least one photovoltaic adapter, and photovoltaic adapters connected to photovoltaic modules in a same photovoltaic module group are connected in series. The power supply system further includes a junction box, a bus, and a centralized monitoring system. The photovoltaic adapters of each of the at least two photovoltaic module groups are connected in parallel to the junction box after being connected in series and are connected to the bus by using the junction box. The centralized monitoring system is configured to control, based on a voltage of the bus, the photovoltaic adapter connected to each photovoltaic module to adjust an output voltage of the photovoltaic adapter to a target voltage. A quantity of photovoltaic modules in each photovoltaic module group may be flexibly configured. Flexible management of each photovoltaic module can be implemented by using the photovoltaic adapter connected to each photovoltaic module, thereby improving management flexibility of the photovoltaic module in the power supply system and improving power supply reliability of the system with high applicability.

With reference to the first aspect, in a first possible implementation, one or more photovoltaic modules in one of the at least two photovoltaic module groups are connected to one photovoltaic adapter.

With reference to the first aspect, in a second possible implementation, one photovoltaic module in one of the at least two photovoltaic module groups may be connected to one photovoltaic adapter.

In the power supply system, one photovoltaic adapter may serve one photovoltaic module or a plurality of photovoltaic modules. Therefore, an operation is flexible. When a plurality of photovoltaic modules may be connected to one photovoltaic adapter, that is, when one photovoltaic adapter serves a plurality of photovoltaic modules, devices of the power supply system can be reduced, and a structure of the power supply system can be simplified, thereby improving stability of the power supply system. When one photovoltaic module is connected to one photovoltaic adapter, one photovoltaic adapter serves one photovoltaic module, and an output voltage and/or an output current corresponding to the photovoltaic module can be flexibly adjusted. Therefore, applicability is higher.

With reference to the first possible implementation of the first aspect or the second possible implementation of the first aspect, in a third possible implementation, the centralized monitoring system is configured to: determine, based on the voltage of the bus and a quantity of photovoltaic modules in any photovoltaic module group, a voltage adjustment multiple corresponding to each photovoltaic module in any photovoltaic module group, and control the photovoltaic adapter connected to each photovoltaic module to adjust the output voltage to the target voltage based on the voltage adjustment multiple. In the power supply system, the centralized monitoring system can control the photovoltaic adapter connected to each photovoltaic module to adjust the output voltage, thereby improving management flexibility of the photovoltaic module with high applicability.

With reference to the third possible implementation of the first aspect, in a fourth possible implementation, the centralized monitoring system is further configured to: determine a target voltage adjustment multiple based on the voltage of the bus and a target bus voltage and deliver the target voltage adjustment multiple to the photovoltaic adapter connected to each photovoltaic module. The photovoltaic adapter connected to any one of the photovoltaic modules is configured to adjust the output voltage to the target voltage based on the target voltage adjustment multiple. In the power supply system, the photovoltaic adapter can flexibly adjust the output voltage (including boosting or bucking the output voltage) based on the voltage adjustment multiple delivered by the centralized monitoring system, so that the photovoltaic adapters connected to the photovoltaic modules in each photovoltaic module group are connected in parallel to the bus at a consistent voltage. Therefore, an operation is flexible and applicability is high.

With reference to the fourth possible implementation of the first aspect, in a fifth possible implementation, power line carrier communication is used between the centralized monitoring system and the photovoltaic adapter connected to each photovoltaic module. This can reduce communication wiring and a mounting requirement with higher applicability.

With reference to the second possible implementation of the first aspect, in a sixth possible implementation, the at least two photovoltaic module groups include a target photovoltaic module group, and the target photovoltaic module group includes at least two photovoltaic modules. The photovoltaic adapter connected to any one of the at least two photovoltaic modules is further configured to: when it is detected that an output current of any photovoltaic module decreases, adjust the output current to a series current based on the series current of the photovoltaic adapters connected to the at least two photovoltaic modules. Herein, the series current is a current obtained after the photovoltaic adapters connected to the photovoltaic modules in any photovoltaic module group are connected in series. The decrease in the output current of the photovoltaic module may be caused by that the photovoltaic module is shielded. In the power supply system, it is assumed that an output current decreases because any photovoltaic module is shielded. The photovoltaic adapter connected to the photovoltaic module may adjust the output current to a series current. This reduces an impact of the decrease in the output current of the photovoltaic module on power generation and an output power of another photovoltaic module in the photovoltaic module group in which the photovoltaic module is located and improves stability of the power supply system with high applicability.

With reference to any one of the first aspect to the sixth possible implementation of the first aspect, in a seventh possible implementation, any photovoltaic adapter connected to any photovoltaic module includes a power supply, a first switch, a second switch, a third switch, a fourth switch, a first inductor, a second inductor, a capacitor, and a diode. The first switch and the second switch are connected in parallel to two terminals of the power supply after being connected in series, one terminal of the first inductor is separately connected to the first switch and the second switch, the other terminal of the first inductor is separately connected to the third switch and the fourth switch, the other terminal of the fourth switch is separately connected to the capacitor and a cathode of the diode, the other terminal of the capacitor is separately connected to the second switch and the third switch, the diode is connected in parallel to the capacitor, and an anode of the diode is connected to the second inductor. In the power supply system, the photovoltaic adapter connected to any photovoltaic module may perform automatic bypass output by using the diode when the photovoltaic module does not have an output (for example, the photovoltaic module fails) or a circuit failure occurs in the photovoltaic adapter. This does not affect power generation of another photovoltaic module in the photovoltaic module group in which the any photovoltaic module is located, thereby improving power supply reliability of the system with high applicability.

According to a second aspect, the embodiments may provide a power supply control method. The method is applicable to the centralized monitoring system of the power supply system provided in any one of the first aspect to the seventh possible implementation of the first aspect. In this method, the centralized monitoring system may monitor the voltage of the bus, and control, based on the voltage of the bus, the photovoltaic adapter connected to each photovoltaic module in the power supply system to adjust the output voltage of the photovoltaic adapter to the target voltage.

With reference to the second aspect, in a first possible implementation, the centralized monitoring system may determine, based on the voltage of the bus and the quantity of photovoltaic modules in any photovoltaic module group in the power supply system, the voltage adjustment multiple corresponding to each photovoltaic module in any photovoltaic module group, and control the photovoltaic adapter connected to each photovoltaic module to adjust the output voltage to the target voltage based on the voltage adjustment multiple.

With reference to the first possible implementation of the second aspect, in a second possible implementation, the centralized monitoring system may further determine the target voltage adjustment multiple based on the voltage of the bus and the target bus voltage, and deliver the target voltage adjustment multiple to the photovoltaic adapter connected to each photovoltaic module in the power supply system, to trigger the photovoltaic adapter connected to any one of the photovoltaic modules to adjust the output voltage to the target voltage based on the target voltage adjustment multiple.

The centralized monitoring system can control the photovoltaic adapter connected to each photovoltaic module to adjust the output voltage, thereby improving management flexibility of the photovoltaic module in the power supply system and improving power supply reliability of the system with high applicability.

DETAILED DESCRIPTION OF THE EMBODIMENTS

Solar energy is inexhaustible and pollution-free green energy given by nature. In other words, solar energy is clean and renewable new energy, and plays wide roles in life and work of people. One of the roles is that the solar energy is converted into electric energy. Solar power generation may be classified into photothermal power generation and photovoltaic power generation. A power supply system may be a power supply system based on solar photovoltaic power generation. The solar photovoltaic power generation has features such as no moving component, no noise, no pollution, and high reliability, and has an excellent application prospect in a communication power supply system in a remote region. The power supply system may be applicable to power supply of a plurality of types of power consumption devices such as a base station device in a remote region with no or poor mains, a storage battery, or a domestic device (for example, a refrigerator or an air conditioner). An application may be determined based on an actual application scenario. This is not limited herein.

The power supply system may include at least two photovoltaic module groups. One or more photovoltaic modules in each photovoltaic module group may be connected to one photovoltaic adapter, or each photovoltaic module is connected to one photovoltaic adapter, and photovoltaic adapters corresponding to a same photovoltaic module group are connected in series. The photovoltaic adapters of one photovoltaic module group may be connected in parallel to a junction box with the photovoltaic adapters of another photovoltaic module group after being connected in series and may be connected to a bus by using the junction box, thereby supplying power to various power consumption devices. That is, in the power supply system, the photovoltaic adapters connected to the photovoltaic modules in a same photovoltaic module group are connected in series, and the photovoltaic adapters connected to the photovoltaic modules in different photovoltaic module groups are connected in parallel to the junction box, and then are connected to the bus by using the junction box. The power supply system can coordinate output voltages of the photovoltaic adapters of each photovoltaic module group by using a centralized monitoring system, so that the photovoltaic adapters of each photovoltaic module group are connected in parallel to the bus at a consistent voltage without adding an additional DC/DC converter for voltage power conversion. Therefore, an operation is more flexible, and power supply reliability of the system is improved with high applicability. The power supply system may be adapted to different application scenarios, for example, a solar power supply scenario and a solar hybrid power supply scenario. The solar power supply scenario may be used as an example for description.

Figure 1:
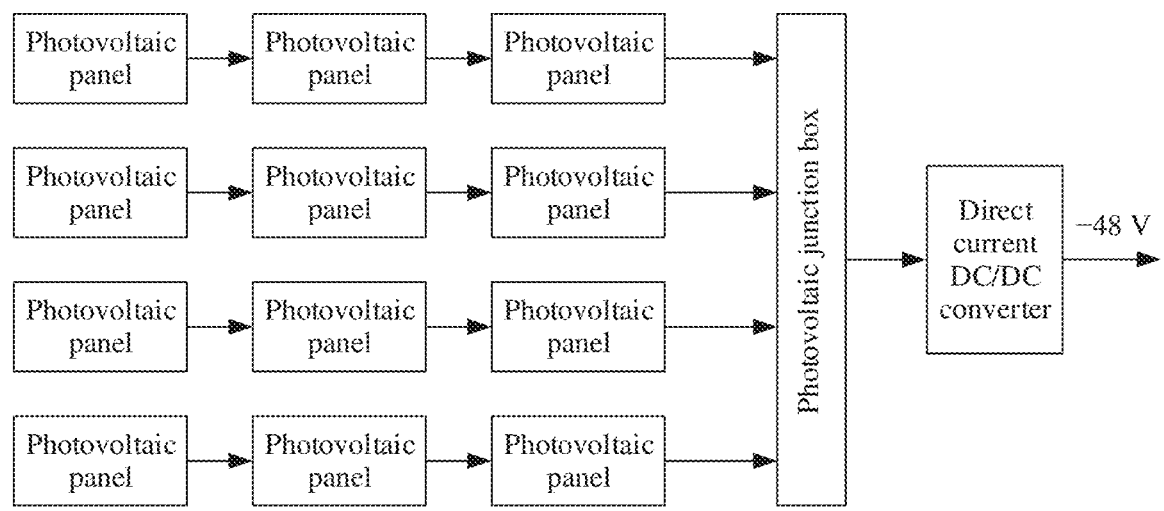
FIG. 1 is a schematic diagram of a structure of a solar base station power supply system.
Figure 2:
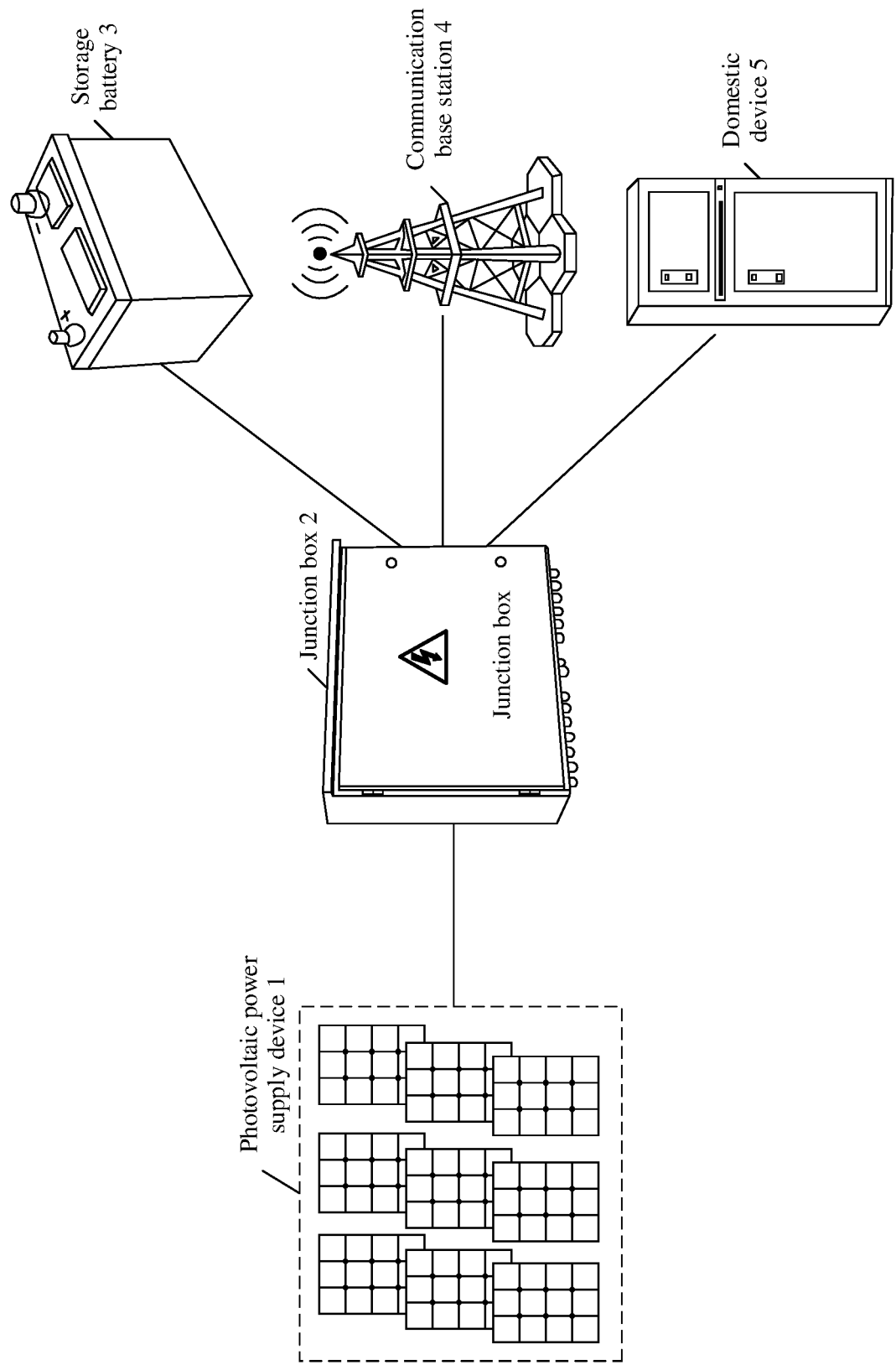
FIG. 2 is a schematic diagram of an application scenario of a power supply system.

FIG. 2 is a schematic diagram of an application scenario of a power supply system. As shown in FIG. 2, a photovoltaic power supply device 1 may include at least two photovoltaic module groups and a photovoltaic adapter connected to at least one photovoltaic module in each photovoltaic module group, where one or more photovoltaic modules may be connected to one photovoltaic adapter, or each photovoltaic module is connected to one photovoltaic adapter. Herein, the photovoltaic module may be a solar panel or a photovoltaic panel. It may be understood that when a plurality of photovoltaic modules in the power supply system are connected to one photovoltaic adapter, the plurality of photovoltaic modules may be separately connected to the photovoltaic adapter, and the photovoltaic adapter may adjust an output voltage and/or an output current of the photovoltaic adapter based on a voltage and/or current adjustment requirement corresponding to any one of the plurality of photovoltaic modules. Optionally, the plurality of photovoltaic modules may alternatively be connected to the photovoltaic adapter as one unit, and the photovoltaic adapter may also adjust an output current or an output voltage of the unit based on a voltage and/or current adjustment requirement corresponding to the unit. A case may be determined based on an actual application scenario. This is not limited herein. For ease of description, the following uses an example in which one photovoltaic module is connected to one photovoltaic adapter for description. The photovoltaic adapters corresponding to a same photovoltaic module group in the photovoltaic power supply device 1 may be connected in parallel to a junction box (for example, a junction box 2) with the photovoltaic adapters of another photovoltaic module group after being connected in series. Then the photovoltaic adapters of the two photovoltaic module groups are combined in the junction box 2, and then connected to a bus, to supply power to a plurality of types of power consumption devices such as a storage battery (for example, a storage battery 3), a base station device (for example, a communication base station 4), and a domestic device (for example, a domestic device 5 such as a refrigerator) by using the bus. In other words, in the application scenario shown in FIG. 2, the photovoltaic power supply device 1 may include at least two photovoltaic module groups, one photovoltaic module group may include one or more photovoltaic modules (namely, at least one photovoltaic module), one photovoltaic module may be connected to one photovoltaic adapter, and photovoltaic adapters connected to the photovoltaic modules in a same photovoltaic module group are connected in series. The photovoltaic adapters of each photovoltaic module group may be connected in parallel to the junction box 2 after being connected in series, to be further connected to a direct current bus by using the junction box 2. The power supply system can coordinate output voltages of the photovoltaic adapters of each photovoltaic module group by using a centralized monitoring system, so that the photovoltaic adapters of each photovoltaic module group are connected in parallel to the bus at a consistent voltage without using a DC/DC converter for voltage power conversion. Therefore, an operation is more flexible and applicability is higher.

The following describes, with reference to FIG. 3 to FIG. 7b by using examples, the power supply system and an operation principle of the power supply system.

Figure 3:
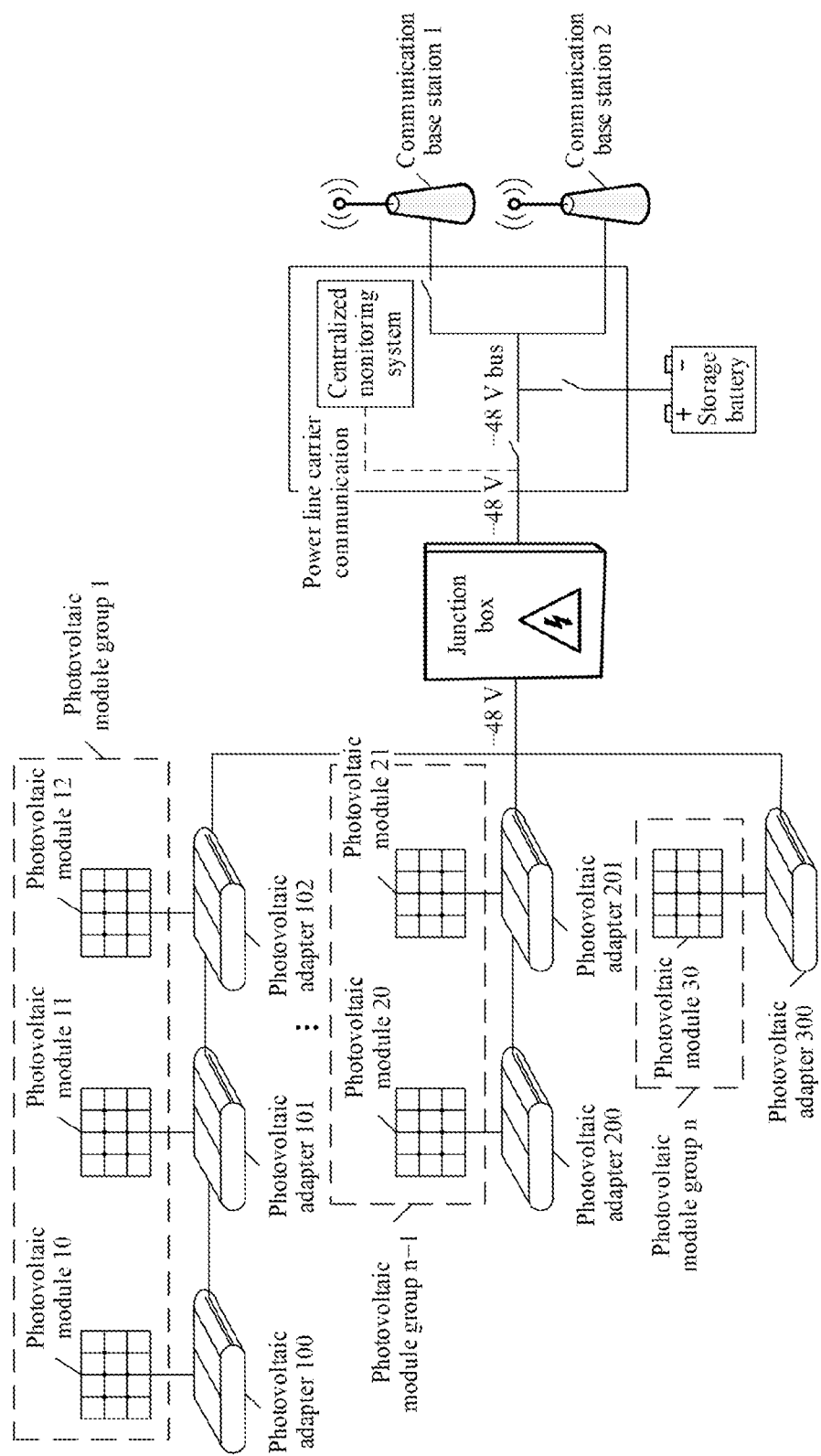
FIG. 3 is a schematic diagram of an architecture of a power supply system.

FIG. 3 is a schematic diagram of an architecture of a power supply system. As shown in FIG. 3, the power supply system may include at least two photovoltaic module groups (for example, a photovoltaic module group 1 to a photovoltaic module group n), one photovoltaic module group may include one or more photovoltaic modules (namely, at least one photovoltaic module), one photovoltaic module may be connected to one photovoltaic adapter, and photovoltaic adapters connected to the photovoltaic modules in a same photovoltaic module group are connected in series.

As shown in FIG. 3, the at least two photovoltaic module groups are described by using the photovoltaic module group 1 to the photovoltaic module group n as an example. The photovoltaic module group 1 may include three photovoltaic modules (for example, a photovoltaic module 10, a photovoltaic module 11, and a photovoltaic module 12), . . . , the photovoltaic module group n−1 may include two photovoltaic modules (for example, a photovoltaic module 20 and a photovoltaic module 21), and the photovoltaic module group n may include one photovoltaic module (for example, a photovoltaic module 30). In the photovoltaic module group 1, a photovoltaic adapter 100 connected to the photovoltaic module 10, a photovoltaic adapter 101 connected to the photovoltaic module 11, and a photovoltaic adapter 102 connected to the photovoltaic module 12 are connected in series. In the photovoltaic module group n−1, a photovoltaic adapter 200 connected to the photovoltaic module 20 and a photovoltaic adapter 201 connected to the photovoltaic module 21 are connected in series. In the photovoltaic module group n, the photovoltaic module 30 is connected to a photovoltaic adapter 300. The photovoltaic adapter may convert an output voltage of the photovoltaic module into a target voltage (for example, −48 V), and has a maximum power point tracking (MPPT) function. Herein, the photovoltaic adapter may be a photovoltaic MPPT controller. The photovoltaic MPPT controller can track and control a change of the output voltage and a change of an output current that are caused by a change of a surface temperature and a change of solar irradiance of the photovoltaic module, so that the photovoltaic module keeps operating at a maximum power output. This behavior of obtaining the maximum power output is referred to as maximum power point tracking. Herein, the photovoltaic adapter can detect a power generation voltage of the photovoltaic module in real time and track a maximum output current and a maximum output voltage of the photovoltaic module, so that the power supply system supplies power to a power consumption device at a maximum power output, thereby improving power supply efficiency of the system.

In some feasible implementations, in a commonly used solar base station power supply system, a fixed quantity of photovoltaic panels (namely, photovoltaic modules) may be usually connected in parallel to a photovoltaic junction box (the photovoltaic junction box may be referred to as a junction box or a junction box for short) after being connected in series. In this case, a quantity of photovoltaic panels in a photovoltaic string needs to be consistent, and a configuration quantity of photovoltaic panels needs to be N (namely, a quantity of parallel branches) times the quantity of photovoltaic panels in the photovoltaic string. In the power supply system, to eliminate the limitation that the configuration quantity of photovoltaic panels needs to be N times the quantity of photovoltaic panels in the photovoltaic string, one photovoltaic adapter may be connected to one photovoltaic module, so that a quantity of photovoltaic modules in each photovoltaic module group can be flexibly configured (for example, one or more photovoltaic modules may be configured in one photovoltaic module group). In addition, a series-parallel MPPT mismatch problem is resolved, and waste of solar resources is reduced.

As shown in FIG. 3, the power supply system may further include a junction box, a bus, and a centralized monitoring system. The bus is a wire that is made of a copper or aluminum material with a high conductivity, that is configured to transmit electric energy, and that collects and distributes power. The photovoltaic adapters (for example, the photovoltaic adapter 100, the photovoltaic adapter 101, and the photovoltaic adapter 102) of each (for example, the photovoltaic module group n−1) of the photovoltaic module group 1 to the photovoltaic module group n may be connected in parallel to the junction box after being connected in series, and then connected to the bus (for example, a direct current bus of −48 V) by using the junction box. Herein, the photovoltaic adapter may be directly connected to the bus. This avoids secondary conversion of the output voltage of the photovoltaic module and improves voltage conversion efficiency. Power line carrier communication (M Bus) may be used between the centralized monitoring system and the photovoltaic adapter (for example, the photovoltaic adapter 100, the photovoltaic adapter 101, the photovoltaic adapter 102, the photovoltaic adapter 200, the photovoltaic adapter 201, . . . , or the photovoltaic adapter 300) connected to each photovoltaic module. This can reduce communication wiring and a mounting requirement with higher applicability. The centralized monitoring system may control, based on a voltage (for example, −48 V) of the bus, the photovoltaic adapter connected to each photovoltaic module to adjust an output voltage of the photovoltaic adapter to a target voltage. In this case, all parallel voltages corresponding to the photovoltaic adapters of each photovoltaic module group are −48 V. The voltage of the bus may be a voltage of a busbar, which is a commonly used numerical marking method in power system analysis and engineering calculation, and represents relative values (for example, −48 V) of each physical quantity and each parameter. Herein, the busbar may be a contact of a bus branch, also referred to as a branch point. In other words, the busbar may be a reliable connector between the bus and a branch. The power line carrier communication (namely, M Bus communication) may be used between the photovoltaic adapter and the centralized monitoring system. This reduces communication wiring and a mounting requirement with higher applicability. As shown in FIG. 3, the power supply system may supply power to a storage battery (for example, a lithium ion battery, a lead-acid battery (or referred to as a lead-acid storage battery)), a secondary load (for example, a communication base station 1), and a primary load (for example, a communication base station 2) by using the direct current bus of −48 V. The storage battery is configured to directly store a direct current provided by the photovoltaic module group, to supply power to the primary load and the secondary load. Herein, the primary load and the secondary load each may be a direct current load. Optionally, the primary load and the secondary load each may alternatively be an alternating current load. The primary load and the secondary load may be determined based on an actual application scenario. This is not limited herein. When the primary load and the secondary load each are an alternating current load, the direct current may be converted into an alternating current by an inverter (for example, a DC/alternating current (AC) converter), and then power is supplied to the primary load and the secondary load.

Figure 4:
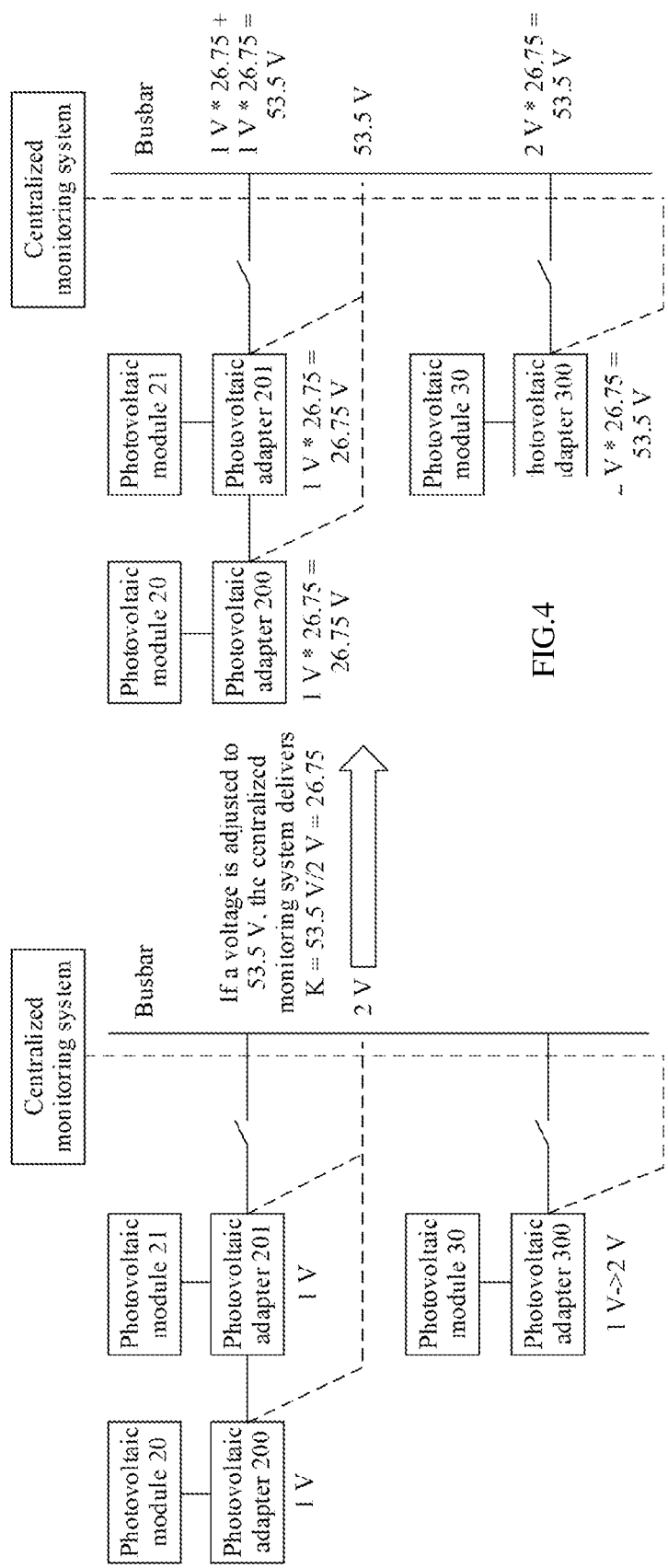
FIG. 4 is a schematic diagram of a scenario in which a photovoltaic adapter adjusts an output voltage.

In some feasible implementations, the centralized monitoring system may monitor the voltage of the bus, may determine, based on the voltage of the bus and a quantity of photovoltaic modules in any photovoltaic module group, a voltage adjustment multiple (the voltage adjustment multiple may be represented by K) corresponding to each photovoltaic module in any photovoltaic module group, and control the photovoltaic adapter connected to each photovoltaic module to adjust the output voltage to the target voltage based on the voltage adjustment multiple. FIG. 4 is a schematic diagram of a scenario in which the photovoltaic adapter adjusts the output voltage. As shown in FIG. 4, for ease of description, two photovoltaic module groups (for example, the photovoltaic module group n−1 and the photovoltaic module group n in FIG. 3) are used as an example for description. The photovoltaic module group n−1 may include the photovoltaic module 20 and the photovoltaic module 21. The photovoltaic adapter connected to the photovoltaic module 20 is the photovoltaic adapter 200, and the photovoltaic adapter connected to the photovoltaic module 21 is the photovoltaic adapter 201. The photovoltaic module group n may include the photovoltaic module 30, and the photovoltaic adapter connected to the photovoltaic module 30 is the photovoltaic adapter 300. Herein, a default output voltage of the photovoltaic adapter (for example, the photovoltaic adapter 200, the photovoltaic adapter 201, or the photovoltaic adapter 300) may be a fixed value (for example, 1 V). When the voltage of the busbar (namely, the voltage of the bus) is 2 V, both current output voltages of the photovoltaic adapter 200 and the photovoltaic adapter 201 are 1 V, and a quantity of photovoltaic modules in the photovoltaic module group n−1 is two. Both voltage adjustment multiples K1 corresponding to the photovoltaic module 20 and the photovoltaic module 21 may be 1. Herein, K1 may also be understood as voltage adjustment multiples corresponding to the photovoltaic adapter 200 and the photovoltaic adapter 201. In this case, the photovoltaic adapter 200 and the photovoltaic adapter 201 each do not need to adjust the output voltage. In this case, the centralized monitoring system does not need to deliver a voltage adjustment instruction to the photovoltaic adapter 200 and the photovoltaic adapter 201 or deliver the voltage adjustment multiple K1 of 1 to the photovoltaic adapter 200 and the photovoltaic adapter 201. When receiving the voltage adjustment multiple, the photovoltaic adapter does not need to adjust the output voltage, that is, maintains the output voltage at 1 V. A current output voltage of the photovoltaic adapter 300 is 1 V, and a quantity of photovoltaic modules in the photovoltaic module group n is one. A voltage adjustment multiple K2 corresponding to the photovoltaic module 30 is 2 (that is, 2 V/1 V). Herein, K2 may also be understood as a voltage adjustment multiple corresponding to the photovoltaic adapter 300. The current output voltage 1 V of the photovoltaic adapter 300 does not reach the voltage 2 V of the bus. In this case, the output voltage of the photovoltaic adapter 300 needs to be adjusted to a target voltage (for example, 2 V). In this case, the centralized monitoring system may determine, based on the voltage of the bus and the quantity (that is, one) of photovoltaic modules in the photovoltaic module group n, that the voltage adjustment multiple corresponding to the photovoltaic module 30 is 2, to control the photovoltaic adapter 300 to adjust the output voltage to the target voltage 2 V based on the voltage adjustment multiple K2 (that is, 2) and the current output voltage 1 V. The current output voltage of the photovoltaic adapter 200 may be 1 V, the current output voltage of the photovoltaic adapter 201 may be 1 V, and the current output voltage of the photovoltaic adapter 300 may be 2 V.

In some feasible implementations, the centralized monitoring system may alternatively determine a target voltage adjustment multiple based on the voltage of the bus and a target bus voltage, and deliver the target voltage adjustment multiple to the photovoltaic adapter connected to each photovoltaic module, so that the photovoltaic adapter connected to any one of the photovoltaic modules can adjust the output voltage to the target voltage based on the target voltage adjustment multiple delivered by the centralized monitoring system. As shown in FIG. 4, when a current voltage (namely, the voltage of the busbar) of the bus needs to be adjusted to a target bus voltage (for example, 53.5 V), the centralized monitoring system may determine, based on the current voltage 2 V of the bus and the target bus voltage 53.5 V, that a target voltage adjustment multiple K3 (namely, K in FIG. 4) is 26.75 (that is, 53.5 V/2 V), and separately deliver the target voltage adjustment multiple 26.75 to the photovoltaic adapter 200, the photovoltaic adapter 201, and the photovoltaic adapter 300. In this case, the photovoltaic adapter 200 may receive the target voltage adjustment multiple 26.75 delivered by the centralized monitoring system and adjust the output voltage to 26.75 V (that is, 1 V*26.75) based on the target voltage adjustment multiple 26.75 and the current output voltage 1 V of the photovoltaic adapter 200. The photovoltaic adapter 201 may receive the target voltage adjustment multiple 26.75 delivered by the centralized monitoring system and adjust the output voltage to 26.75 V (that is, 1 V*26.75) based on the target voltage adjustment multiple 26.75 and the current output voltage 1 V of the photovoltaic adapter 201. The photovoltaic adapter 300 may receive the target voltage adjustment multiple 26.75 delivered by the centralized monitoring system and adjust the output voltage to 53.5 V (that is, 2 V*26.75) based on the target voltage adjustment multiple 26.75 and the current output voltage 2 V of the photovoltaic adapter 300. In this case, parallel voltages corresponding to the photovoltaic adapter 200 and the photovoltaic adapter 201 are 53.5 V (that is, 1 V*26.75+1 V*26.75), and the parallel voltage 53.5 V herein is the same as the target bus voltage 53.5 V. In addition, a parallel voltage 53.5 V corresponding to the photovoltaic adapter 300 is also the same as the target bus voltage 53.5 V. Therefore, an operation is flexible and applicability is high.

Figure 5:
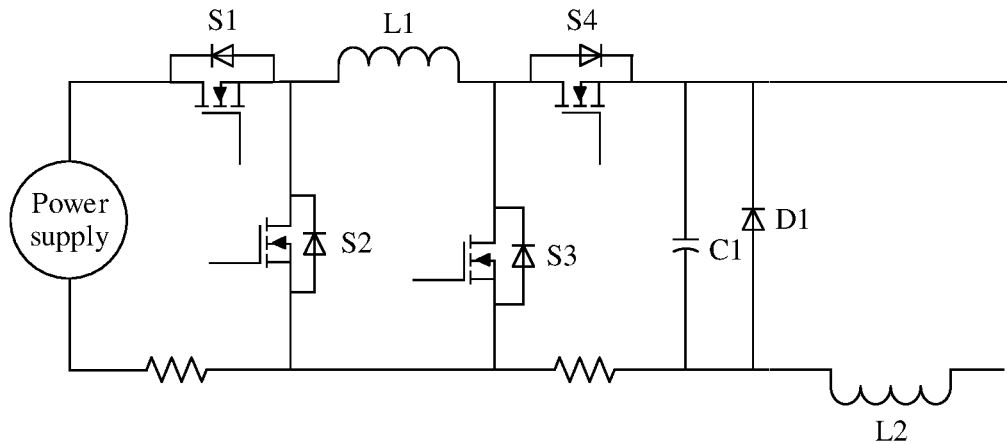
FIG. 5 is a schematic diagram of a circuit of a photovoltaic adapter.

FIG. 5 is a schematic diagram of a circuit of the photovoltaic adapter. As shown in FIG. 5, any photovoltaic adapter connected to any photovoltaic module in the power supply system may use an H-bridge circuit topology. Any photovoltaic adapter may include a power supply, a first switch (for example, a first switch S1), a second switch (for example, a second switch S2), a third switch (for example, a third switch S3), a fourth switch (for example, a fourth switch S4), a first inductor (for example, a first inductor L1), a second inductor (for example, a second inductor L2), a capacitor (for example, a capacitor C1), and a diode (for example, a diode D1). The first switch S1 and the second switch S2 are connected in parallel to two terminals of the power supply after being connected in series, one terminal of the first inductor L1 is separately connected to the first switch S1 and the second switch S2, the other terminal of the first inductor L1 is separately connected to the third switch S3 and the fourth switch S4, the other terminal of the fourth switch S4 is separately connected to the capacitor C1 and a cathode of the diode D1, the other terminal of the capacitor C1 is separately connected to the second switch S2 and the third switch S3, the diode D1 is connected in parallel to the capacitor C1, and an anode of the diode D1 is connected to the second inductor L2. The photovoltaic adapter can implement wide-range input and output, boost or buck the output voltage of the photovoltaic module (that is, a source voltage is used as an input voltage of the photovoltaic adapter), and flexibly control the output voltage of the photovoltaic adapter. Therefore, applicability is high.

When the photovoltaic adapter bucks the source voltage, the fourth switch S4 is turned on and the third switch S3 is turned off. In this case, the first switch S1, the second switch S2, the first inductor L1, and the capacitor C1 may constitute a buck conversion circuit (namely, a buck circuit), and a buck function is implemented by using the buck circuit. When the photovoltaic adapter boosts the source voltage, the first switch S1 is turned on and the second switch S2 is turned off. The third switch S3, the fourth switch S4, the first inductor L1, and the capacitor C1 may constitute a boost chopper circuit (namely, a boost circuit), and a boost function is implemented by using the boost circuit.

Figure 6:
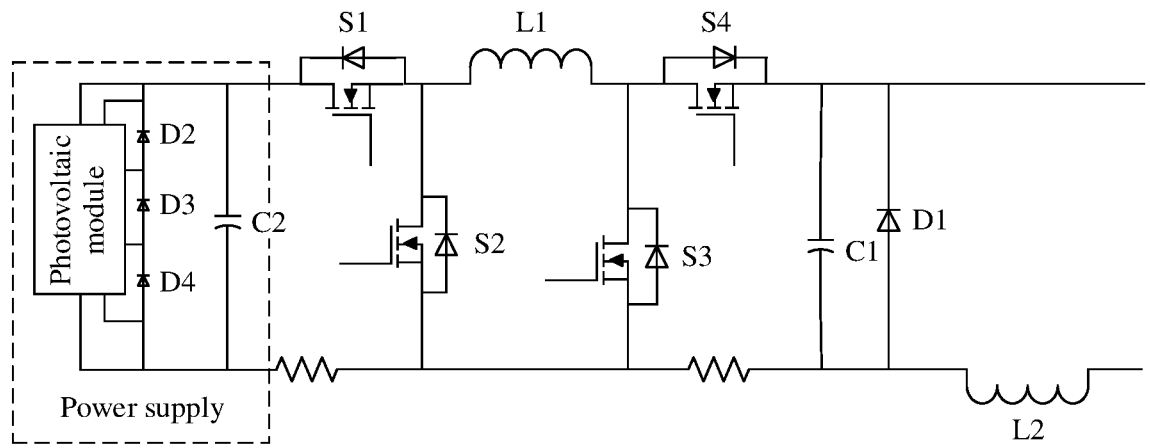
FIG. 6 is a schematic diagram of another circuit of a photovoltaic adapter.

FIG. 6 is a schematic diagram of another circuit of the photovoltaic adapter. In some feasible implementations, the power supply shown in FIG. 5 may include a photovoltaic module, a diode D2, a diode D3, a diode D4, and a capacitor C2. The diode D2 and the diode D3 are connected in parallel to the photovoltaic module after being connected in parallel, an anode of the diode D2 is connected to a cathode of the diode D3, the diode D3 and the diode D4 are connected in parallel to the photovoltaic module after being connected in parallel, an anode of the diode D3 is connected to a cathode of the diode D4, a cathode of the diode D2 and an anode of the diode D4 are respectively connected to two terminals of the photovoltaic module, and the capacitor C2 (for example, a filter capacitor) is connected in parallel to the two terminals of the photovoltaic module.

In some feasible implementations, when any photovoltaic module (assuming that the photovoltaic module is the photovoltaic module 10) or the photovoltaic adapter (assuming that the photovoltaic adapter is the photovoltaic adapter 100) connected to any photovoltaic module fails, automatic bypass output may be performed by using the diode D1. In this way, power generation of another photovoltaic module (for example, the photovoltaic module 11 or the photovoltaic module 12) in a photovoltaic module group (for example, the photovoltaic module group 1) in which the any photovoltaic module is located is not affected, and power supply reliability of the system is improved with higher applicability.

Figure 7A:
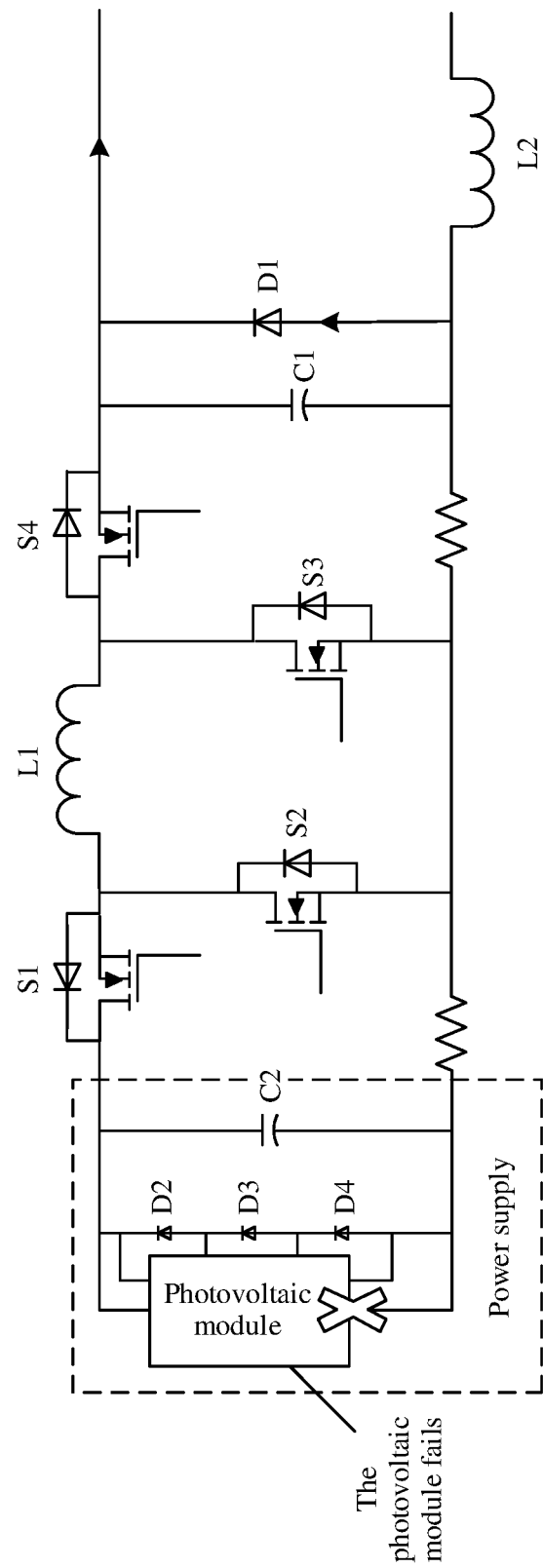
FIG. 7a is a schematic diagram of a circuit of a photovoltaic adapter when a photovoltaic module fails.

FIG. 7a is a schematic diagram of a circuit of the photovoltaic adapter when the photovoltaic module fails. As shown in FIG. 7a, a circuit structure of the photovoltaic adapter may be the same as a circuit structure of the photovoltaic adapter in FIG. 6. When any photovoltaic module (for example, the photovoltaic module 10) fails, the photovoltaic module 10 does not have an output, that is, the source voltage is 0 V. In this case, automatic bypass output may be performed by using the diode D1, so that the failed photovoltaic module 10 and the photovoltaic adapter 100 connected to the photovoltaic module 10 are bypassed. In this case, the failed photovoltaic module 10 does not affect output powers and power generation of the photovoltaic module 11 and the photovoltaic module 12. Therefore, applicability is higher.

Figure 7B:
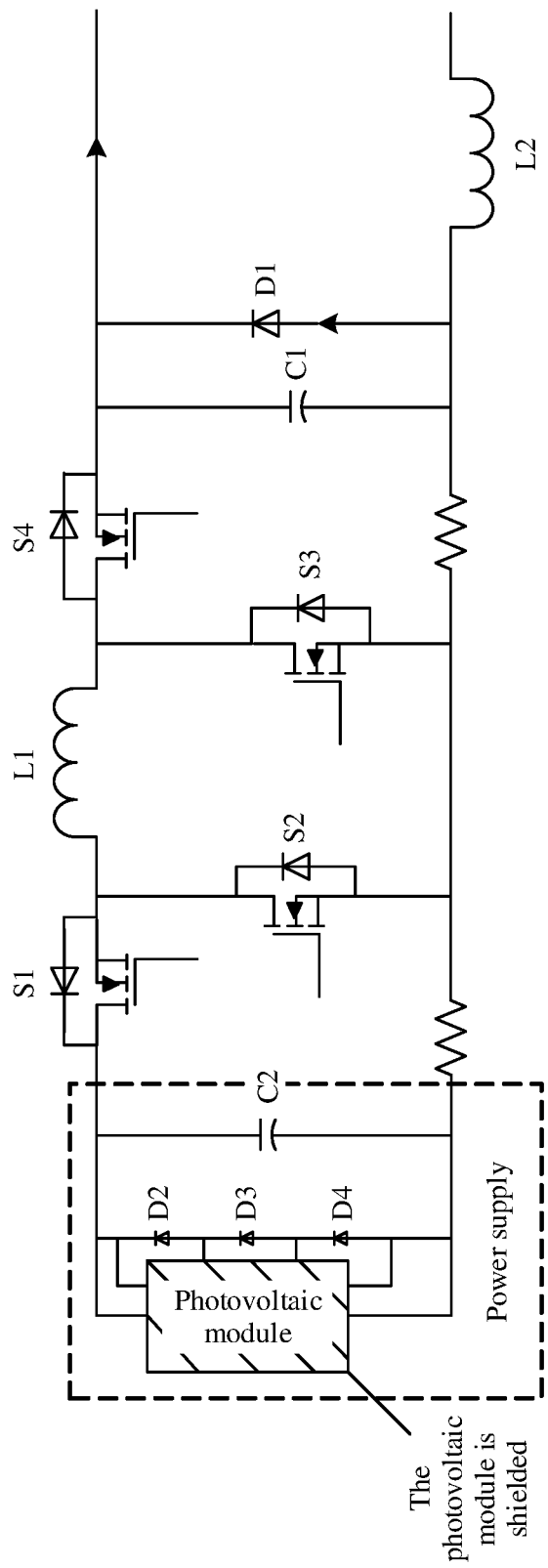
FIG. 7b is a schematic diagram of a circuit of a photovoltaic adapter when a photovoltaic module is shielded.

FIG. 7b is a schematic diagram of a circuit of the photovoltaic adapter when the photovoltaic module is shielded. In some feasible implementations, in a commonly used solar base station power supply system, when a photovoltaic panel is shielded by a shadow, power generation of all photovoltaic panels in a photovoltaic string in which the photovoltaic panel is located is affected. Consequently, solar resources are wasted. As shown in FIG. 7b, a circuit structure of the photovoltaic adapter may be the same as the circuit structure of the photovoltaic adapter in FIG. 6. When the photovoltaic module 20 is shielded (for example, completely shielded), the photovoltaic module 20 does not have an output, that is, the source voltage is 0 V. In this case, automatic bypass output may be performed by using the diode D1, so that the shielded photovoltaic module 20 and the photovoltaic adapter (for example, the photovoltaic adapter 200) connected to the photovoltaic module 20 are bypassed. In this case, the photovoltaic module 20 shielded by the shadow does not affect an output power and power generation of the photovoltaic module 21, and utilization efficiency of solar resources is improved with higher applicability.

In some feasible implementations, the at least two photovoltaic module groups may include a target photovoltaic module group (assuming that the target photovoltaic module group is the photovoltaic module group 1 or the photovoltaic module group n−1), and the target photovoltaic module group may include at least two photovoltaic modules. When the photovoltaic module is shielded, an output current of the photovoltaic module decreases. In this case, the photovoltaic adapter connected to any one of the at least two photovoltaic modules may be further configured to: when it is detected that an output current of any photovoltaic module decreases, adjust the output current to a series current based on the series current of the photovoltaic adapters connected to the at least two photovoltaic modules. For example, the photovoltaic module 1 in the photovoltaic module group 1 is used as an example for description. When the photovoltaic module 10 is shielded (for example, partially shielded), an output current of the photovoltaic module 10 decreases. In this case, the photovoltaic adapter 100 connected to the photovoltaic module 10 is configured to: when it is detected that the output current of the photovoltaic module 10 decreases, adjust the output current to a series current based on the series current (that is, a current obtained after the photovoltaic adapters connected to the photovoltaic modules in the photovoltaic module group 1 are connected in series) of the photovoltaic adapters (for example, the photovoltaic adapter 100, the photovoltaic adapter 101, and the photovoltaic adapter 102) connected to the at least two photovoltaic modules (for example, the photovoltaic module 10, the photovoltaic module 11, and the photovoltaic module 12) in the photovoltaic module group 1. In addition, the photovoltaic adapter 100 connected to the photovoltaic module 10 may adjust the output voltage to the target voltage, so that a voltage obtained after the photovoltaic adapter 100, the photovoltaic adapter 101, and the photovoltaic adapter 102 are connected in series is the same as the current voltage of the bus. It may be understood that when the photovoltaic module group includes one photovoltaic module (assuming that the photovoltaic module is the photovoltaic module 30) and the photovoltaic module is shielded, an output current of the photovoltaic module does not need to be adjusted to a series current, and the photovoltaic adapter (for example, the photovoltaic adapter 300) connected to the photovoltaic module needs to automatically adjust only the output voltage of the photovoltaic adapter to be the same as the current voltage of the bus.

In the power supply system, the quantity of photovoltaic modules in the photovoltaic module group can be flexibly configured, and power supply reliability of the system can be improved with high applicability.

Figure 8:
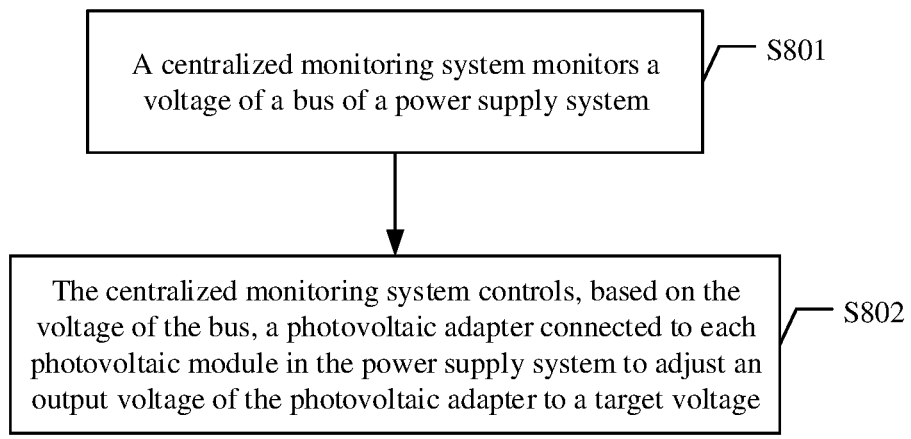
FIG. 8 is a schematic flowchart of a power supply control method.

FIG. 8 is a schematic flowchart of a power supply control method. The power supply control method may be applicable to the centralized monitoring system of the power supply system provided in FIG. 3 to FIG. 7b. The method includes the following steps:

S801: The centralized monitoring system monitors a voltage of the bus of the power supply system.

S802: The centralized monitoring system controls, based on the voltage of the bus, the photovoltaic adapter connected to each photovoltaic module in the power supply system to adjust an output voltage of the photovoltaic adapter to a target voltage.

In some feasible implementations, the centralized monitoring system may monitor the voltage of the bus in the power supply system, may determine, based on the voltage of the bus and a quantity of photovoltaic modules in any photovoltaic module group in the power supply system, a voltage adjustment multiple (the voltage adjustment multiple may be represented by K) corresponding to each photovoltaic module in any photovoltaic module group, and control the photovoltaic adapter connected to each photovoltaic module to adjust the output voltage to the target voltage based on the voltage adjustment multiple. As shown in FIG. 4, it is assumed that the centralized monitoring system detects that the voltage of the busbar (namely, the voltage of the bus) is 2 V, both current output voltages of the photovoltaic adapter 200 and the photovoltaic adapter 201 are 1 V, and a quantity of photovoltaic modules in the photovoltaic module group n−1 is two. Both voltage adjustment multiples K1 corresponding to the photovoltaic module 20 and the photovoltaic module 21 may be 1. Herein, K1 may also be understood as voltage adjustment multiples corresponding to the photovoltaic adapter 200 and the photovoltaic adapter 201. In this case, the photovoltaic adapter 200 and the photovoltaic adapter 201 each do not need to adjust the output voltage. In this case, the centralized monitoring system does not need to deliver a voltage adjustment instruction to the photovoltaic adapter 200 and the photovoltaic adapter 201 or deliver the voltage adjustment multiple K1 of 1 to the photovoltaic adapter 200 and the photovoltaic adapter 201. When receiving the voltage adjustment multiple, the photovoltaic adapter does not need to adjust the output voltage, that is, maintains the output voltage at 1 V. When the centralized monitoring system detects that a current output voltage of the photovoltaic adapter 300 is 1 V, and a quantity of photovoltaic modules in the photovoltaic module group n is one, a voltage adjustment multiple K2 corresponding to the photovoltaic module 30 may be 2 (that is, 2 V/1 V). Herein, K2 may also be understood as a voltage adjustment multiple corresponding to the photovoltaic adapter 300. The current output voltage 1 V of the photovoltaic adapter 300 does not reach the voltage 2 V of the bus. In this case, the output voltage of the photovoltaic adapter 300 needs to be adjusted to a target voltage (for example, 2 V). In this case, the centralized monitoring system may determine, based on the voltage of the bus and the quantity (that is, one) of photovoltaic modules in the photovoltaic module group n, that the voltage adjustment multiple corresponding to the photovoltaic module 30 is 2, and deliver the voltage adjustment multiple 2 to the photovoltaic adapter 300, to control the photovoltaic adapter 300 to adjust the output voltage to the target voltage 2 V based on the voltage adjustment multiple K2 (that is, 2) and the current output voltage 1 V. The current output voltage of the photovoltaic adapter 200 may be 1 V, the current output voltage of the photovoltaic adapter 201 may be 1 V, and the current output voltage of the photovoltaic adapter 300 may be 2 V.

In some feasible implementations, the centralized monitoring system may alternatively determine a target voltage adjustment multiple based on the voltage of the bus and a target bus voltage, and deliver the target voltage adjustment multiple to the photovoltaic adapter connected to each photovoltaic module, to trigger the photovoltaic adapter connected to any one of the photovoltaic modules to adjust the output voltage to the target voltage based on the target voltage adjustment multiple delivered by the centralized monitoring system. As shown in FIG. 4, when a current voltage (namely, the voltage of the busbar) of the bus needs to be adjusted to a target bus voltage (for example, 53.5 V), the centralized monitoring system may determine, based on the current voltage 2 V of the bus and the target bus voltage 53.5 V, that a target voltage adjustment multiple K3 (namely, K in FIG. 4) is 26.75 (that is, 53.5 V/2 V), and separately deliver the target voltage adjustment multiple 26.75 to the photovoltaic adapter 200, the photovoltaic adapter 201, and the photovoltaic adapter 300. In this case, the photovoltaic adapter 200 may receive the target voltage adjustment multiple 26.75 delivered by the centralized monitoring system and adjust the output voltage to 26.75 V (that is, 1 V*26.75) based on the target voltage adjustment multiple 26.75 and the current output voltage 1 V of the photovoltaic adapter 200. The photovoltaic adapter 201 may receive the target voltage adjustment multiple 26.75 delivered by the centralized monitoring system and adjust the output voltage to 26.75 V (that is, 1 V*26.75) based on the target voltage adjustment multiple 26.75 and the current output voltage 1 V of the photovoltaic adapter 201. The photovoltaic adapter 300 may receive the target voltage adjustment multiple 26.75 delivered by the centralized monitoring system and adjust the output voltage to 53.5 V (that is, 2 V*26.75) based on the target voltage adjustment multiple 26.75 and the current output voltage 2 V of the photovoltaic adapter 300. In this case, parallel voltages corresponding to the photovoltaic adapter 200 and the photovoltaic adapter 201 are 53.5 V (that is, 1 V*26.75+1 V*26.75), and the parallel voltage 53.5 V herein is the same as the target bus voltage 53.5 V. In addition, a parallel voltage 53.5 V corresponding to the photovoltaic adapter 300 is also the same as the target bus voltage 53.5 V. Therefore, an operation is flexible and applicability is high.

In an implementation, for more operations performed by the centralized monitoring system in the power supply control method, refer to implementations performed by the centralized monitoring system in the power supply system shown in FIG. 3 to FIG. 7b and the operation principle of the power supply system. Details are not described herein again.

The centralized monitoring system can control the photovoltaic adapter connected to each photovoltaic module to adjust the output voltage, thereby improving management flexibility of the photovoltaic module in the power supply system and improving power supply reliability of the system with high applicability.

The foregoing descriptions are merely implementations but are not intended to limit the scope of the embodiments. Any variation or replacement readily figured out by a person skilled in the art shall fall within the scope of the embodiments.

What is claimed is:

1. A power supply system, comprising:
   at least two photovoltaic module groups, one photovoltaic module group comprises at least one photovoltaic module, the at least one photovoltaic module is connected to at least one photovoltaic adapter, photovoltaic adapters connected to photovoltaic modules in a same photovoltaic module group are connected in series,
   a junction box;
   a bus; and
   a centralized monitoring system;
   the photovoltaic adapters of each of the at least two photovoltaic module groups are connected in parallel to the junction box after being connected in series, and are connected to the bus by using the junction box; and
   the centralized monitoring system is configured to control, based on a voltage of the bus, the photovoltaic adapter connected to each photovoltaic module to adjust an output voltage of the photovoltaic adapter to a target voltage;
   wherein each of the at least two photovoltaic module groups includes one or more photovoltaic modules, and wherein at least one group of the at least two photovoltaic module groups has a different number of photovoltaic modules in the group from at least another group of the at least two photovoltaic module groups;
   wherein the photovoltaic adapter is provided in one photovoltaic module group and wherein the centralized monitoring system is configured to control the photovoltaic adapter connected to each photovoltaic module to adjust the output voltage to the target voltage based on a quantity of photovoltaic modules associated with the one photovoltaic module group;
   wherein the centralized monitoring system is further configured to determine, based on the voltage of the bus and the quantity of photovoltaic modules in any of the at least two photovoltaic module groups, a voltage adjustment multiple corresponding to each photovoltaic module in any of the at least two photovoltaic module groups; and
   wherein the centralized monitoring system is further configured to control the photovoltaic adapter connected to each photovoltaic module to adjust the output voltage to the target voltage based on the voltage adjustment multiple.

2. The power supply system according to claim 1, wherein the at least one group of the at least one photovoltaic module groups consists of one photovoltaic module that is connected to one photovoltaic adapter.

3. The power supply system according to claim 1, wherein the centralized monitoring system is further configured to:
   determine a target voltage adjustment multiple based on the voltage of the bus and a target bus voltage, and
   deliver the target voltage adjustment multiple to the photovoltaic adapter connected to each photovoltaic module; and
   the photovoltaic adapter connected to any one of the at least two photovoltaic modules is further configured to adjust the output voltage to the target voltage based on the target voltage adjustment multiple.

4. The power supply system according to claim 3, wherein power line carrier communication is used between the centralized monitoring system and the photovoltaic adapter connected to each photovoltaic module.

5. The power supply system according to claim 2, wherein the at least two photovoltaic module groups further comprise a target photovoltaic module group, and the target photovoltaic module group further comprises at least two photovoltaic modules; and
   the photovoltaic adapter connected to any one of the at least two photovoltaic modules is further configured to:
   when it is detected that an output current of any of the at least two photovoltaic modules decreases, adjust the output current to a series current based on the series current of the photovoltaic adapters connected to the at least two photovoltaic modules.

6. The power supply system according to claim 1, wherein any of the at least one photovoltaic adapter connected to any of the at least two photovoltaic modules further comprises a power supply, a first switch, a second switch, a third switch, a fourth switch, a first inductor, a second inductor, a capacitor, and a diode, wherein
   the first switch and the second switch are connected in parallel to two terminals of the power supply after being connected in series, one terminal of the first inductor is separately connected to the first switch and the second switch, the other terminal of the first inductor is separately connected to the third switch and the fourth switch, the other terminal of the fourth switch is separately connected to the capacitor and a cathode of the diode, the other terminal of the capacitor is separately connected to the second switch and the third switch, the diode is connected in parallel to the capacitor, and an anode of the diode is connected to the second inductor.

7. A method applicable to a centralized monitoring system of a power supply system, wherein the power supply system comprises at least two photovoltaic module groups, one photovoltaic module group comprises at least one photovoltaic module, the at least one photovoltaic module is connected to at least one photovoltaic adapter, photovoltaic adapters connected to photovoltaic modules in a same photovoltaic module group are connected in series, and the power supply system further comprises a junction box, a bus, and a centralized monitoring system;
   the photovoltaic adapters of each of the at least two photovoltaic module groups are connected in parallel to the junction box after being connected in series, and are connected to the bus by using the junction box; and
   the centralized monitoring system is configured to control, based on a voltage of the bus, the photovoltaic adapter connected to each photovoltaic module to adjust an output voltage of the photovoltaic adapter to a target voltage, and the method comprises:
   monitoring, by the centralized monitoring system, the voltage of the bus; and
   controlling, by the centralized monitoring system based on the voltage of the bus, the photovoltaic adapter connected to each photovoltaic module in the power supply system to adjust the output voltage of the photovoltaic adapter to the target voltage;
   wherein each of the at least two photovoltaic module groups includes one or more photovoltaic modules, and wherein at least one group of the at least two photovoltaic module groups has a different number of photovoltaic modules in the group from at least another group of the at least two photovoltaic module groups;
   wherein the photovoltaic adapter is provided in one photovoltaic module group and wherein the method further comprises controlling the photovoltaic adapter connected to each photovoltaic module to adjust the output voltage to the target voltage based on a quantity of photovoltaic modules associated with the one photovoltaic module group;
   wherein controlling, by the centralized monitoring system based on the voltage of the bus, the photovoltaic adapter connected to each photovoltaic module in the power supply system to adjust the output voltage of the photovoltaic adapter to the target voltage further comprises determining, by the centralized monitoring system based on the voltage of the bus and the quantity of photovoltaic modules in any of the at least two photovoltaic module groups in the power supply system, a voltage adjustment multiple corresponding to each photovoltaic module in any of the at least two photovoltaic module groups, and controlling the photovoltaic adapter connected to each photovoltaic module to adjust the output voltage to the target voltage based on the voltage adjustment multiple.

8. The method according to claim 7, further comprising:
   determining, by the centralized monitoring system, the target voltage adjustment multiple based on the voltage of the bus and the target bus voltage; and
   delivering the target voltage adjustment multiple to the photovoltaic adapter connected to each photovoltaic module, to trigger the photovoltaic adapter connected to any one of the at least two photovoltaic modules to adjust the output voltage to the target voltage based on the target voltage adjustment multiple.

* * * * *